United States Patent [19]

Musch et al.

[11] Patent Number: 4,975,501

[45] Date of Patent: Dec. 4, 1990

[54] PROCESS FOR POLYMERIZATION OF CHLOROPRENE

[75] Inventors: Rüdiger Musch, Bergisch Gladbach; Eberhard Müller, Dormagen; Wolfgang Konter, Neuss; Gerhard Hohmann; Ludwig Mott, both of Leverkusen, all of Fed. Rep. of Germany

[73] Assignee: Bayer Aktiengesellschaft, Leverkusen-Bayerwerk, Fed. Rep. of Germany

[21] Appl. No.: 399,333

[22] Filed: Aug. 28, 1989

Related U.S. Application Data

[63] Continuation of Ser. No. 12,554, Feb. 9, 1987, abandoned.

[30] Foreign Application Priority Data

Feb. 19, 1986 [DE] Fed. Rep. of Germany ....... 3605331

[51] Int. Cl.$^5$ .............................................. C08F 2/24
[52] U.S. Cl. ................................... 526/213; 526/295
[58] Field of Search .................... 526/213, 216, 225

[56] References Cited

U.S. PATENT DOCUMENTS

| | | | |
|---|---|---|---|
| 2,569,688 | 10/1951 | Park | 526/225 |
| 2,639,279 | 5/1953 | Caldwell | 526/225 |
| 4,234,704 | 11/1980 | Sakanaka | 526/215 |

FOREIGN PATENT DOCUMENTS

| | | |
|---|---|---|
| 2650342 | 5/1978 | Fed. Rep. of Germany . |
| 2318179 | 2/1977 | France . |
| 2528857 | 12/1983 | France . |
| 1537590 | 1/1979 | United Kingdom . |
| 1547318 | 6/1979 | United Kingdom . |

*Primary Examiner*—Christopher Henderson
*Attorney, Agent, or Firm*—Connolly and Hutz

[57] ABSTRACT

The polymerization of chloroprene leads to non-colored products when a mixture of 2.0 to 5.0% by weight of a salt of disproportionated abietic acid and 0.1 to 1.0% by weight, in each case relative to the total amount of monomer, of a compound of the formula

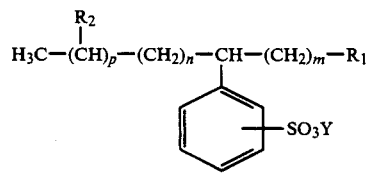

in which
$R_1$ and $R_2$, independently of one another, denote hydrogen or $CH_3$,
m denotes a number from 0 to 14,
n denotes a number from 0 to 13,
p denotes a number from 0 to 2, and
y denotes hydrogen, Na or K, and
the total number of aliphatic carbon atoms is 11 to 15,
is used as emulsifier, the emulsifiers having the advantage of being biologically degradable.

2 Claims, No Drawings

PROCESS FOR POLYMERIZATION OF CHLOROPRENE

This application is a continuation, of application Ser. No. 012,554, filed Feb. 9, 1987, now abandoned.

The invention relates to a process for the continuous emulsion polymerization of chloroprene using certain emulsifiers.

BACKGROUND OF THE INVENTION

It is known that the polymerization of chloroprene can be carried out in the presence of anionic active emulsifiers based on alkali metal salts of disproportionated abietic acid, and in the presence of condensation products from naphthalenesulphonic acid and formaldehyde.

In the conventional work-up by freezing out, some of the surface-active emulsifiers are removed from the polymer and reach the waste water. If the emulsifiers are not biologically degradable, expensive processes must be used to recondition the water.

The condensation products from naphthalenesulphonic acid and formaldehyde which are conventionally used as the second emulsifier, although avoiding a number of disadvantages which other emulsifiers display, formation of insoluble polymers, considerable formation of foam during the removal of the remaining monomer in the degassing, inadequate or too strong polymer adhesion in the drying equipment, deterioration of product properties such as reduction of the pot life in the case of raw material adhesives, have, however, two serious disadvantages.

Firstly, these products are not biologically degradable, and secondly they cause a certain discoloration of the polymer during drying, its use as adhesive for pale materials thereby being made impossible.

BRIEF DESCRIPTION OF THE INVENTION

It has now been found that these disadvantages can be avoided, without serious changes of the other properties occurring, using certain alkylbenzenesulphonates as second emulsifier.

DETAILED DESCRIPTION

The invention therefore relates to a process for the continuous polymerization of chloroprene and, if appropriate, up to 20% by weight, relative to the monomer mixture, of one or more monomers which can be copolymerized with chloroprene, in an aqueous alkaline emulsion in the presence of emulsifiers and initiators at 0° to 60° C., characterized in that a mixture of 2.0 to 5.0% by weight of a salt of disproportionated abietic acid and 0.1 to 1.0% by weight, in each case relative to the total amount of monomer, of a compound of the formula

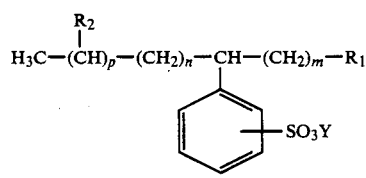

in which $R_1$ and $R_2$, independently of one another, denote hydrogen or $CH_3$, m denotes a number from 0 to 14, n denotes a number from 0 to 13, p denotes a number from 0 to 2, and y denotes hydrogen, Na or K, and the total number of aliphatic carbon atoms is 11 to 15, is used as emulsifier.

In addition, 0.001 to 0.1% by weight, relative to the total monomers, of a hydrocarbon which contains aromatic ($C_A$), naphthenic ($C_N$) and paraffinic ($C_P$) carbon atoms in a concentration of $C_A$ 20–50%, $C_N$ 0–40% and $C_P$ 40–80% and has a molecular weight of 180 to 750, is preferably added. Preferred hydrocarbons are those whose $C_A$ is 30–40%, $C_N$ is 0–10% and $C_P$ is 60–70%. The building tack can be adjusted to specifically the desired degree in each case by means of the addition.

$C_A$, $C_N$ and $C_P$ are determined by the method of J. C. Vlugter et al., J. Instn. Petrol. 18 (1932), page 735.

Preferred polymerization initiators are formamidinesulphinic acid, potassium peroxodisulphate, mixtures of formamidinesulphinic acid and potassium peroxodisulphate, mixtures of potassium peroxodisulphate and sodium $\beta$-anthraquinonesulphonate or mixtures of formamidinesulphinic acid, potassium peroxodisulphate and sodium $\beta$-anthraquinonesulphonate, and combinations of the abovementioned initiators and initiator mixtures with sodium dithionite, or sodium dithionite alone.

Depending on the proposed use of the polymer, the monomers are converted to the extent of 50 to 99%, conversions between 60 and 70% being suitable for solid rubbers to achieve advantageous applicational values, whereas lattices which are required for paper hardening or bitumen treatment are prepared with a high conversion up to 99%, preferably 85 to 99%.

Suitable comonomers are, for example, acrylonitrile, methacrylonitrile, acrylates, methacrylates, vinylidine chloride, styrene, vinyltoluenes, (1,3)-butadiene, 1-chloro-(1,3)-butadiene, 2,3-dichloro-(1,3)-butadiene, 2-chloro-3-methyl-(1,3)-butadiene and sulphur, sulphur and 2,3-dichloro-(1,3)-butadiene being preferred.

The structure and the properties of the polymers can be varied within broad limits by adding known compounds, for example mercaptans, which are effective as regulators.

In a preferred embodiment, particularly when gel-free polymers are to be prepared, regulators are added, to be precise staggered at the commencement of polymerization and during the polymerization.

Preferred chain transfer agents are aliphatic mercaptans, particularly those having 8 to 18 carbon atoms. The mercaptans can be straight-chain or branched. Thus, primary, secondary and tertiary mercaptans can be used, but the most preferred mercaptan is n-dodecyl mercaptan. Other known chain transfer agents, for example aromatic disulphides or alkylxanthogen disulphides having 1 to 12 carbon atoms in the alkyl group, or heterocyclic ring compounds can also be used in place of the alkyl groups, such as bis-(5-ethyl-1,3-dioxan-5-ylmethyl)-xanthogen disulphide.

Unreacted organic compounds can be removed after the reaction by steam distillation, for example at 50° C. and at absolute pressure of 20 torr.

The polymerization experiments described in the following examples were carried out to achieve particularly defined reaction conditions in a 6-vessel cascade operated continuously.

This continuous polymerization of chloroprene is known from U.S. Pat. Nos. 2,384,277, 2,394,291 and 2,831,842.

The monomer, including stabilizer and regulator, was pre-emulsified in the aqueous phase containing emulsifier and caustic soda and then reached the reaction vessel into which the initiator was additionally metered in. Analogous results for the polymerization were also obtained without pre-emulsification.

After leaving the stirred vessel cascade, the reaction was terminated by adding t-butylpyrocatechol or diethylhydroxylamine and simultaneous removal of the monomer. The pH of the alkali latex was reduced to pH 6.5 by means of dilute acetic acid, and the polymer was isolated from this emulsion by freeze coagulation and dried (Chem. Engng. Progr. 43, 391 (1974), German Patent Specification No. 1,051,506).

In this known process, the latex coagulates on a chilled mill rotating in the latex. The rubber foil, containing ice, produced on the mill surface is lifted off and fed over a washing belt, where the ice is re-thawed. The wet foil subsequently runs through mangle rollers, is partially dried, and reaches the stage dryer with a water content of about 30% by weight. There, the polymer band, in each case guided over deflection rollers, passes through several stacked stages, where it is dried using hot air. The foil subsequently leaves the drier, is brought together to form a strand, and is cut into the desired pieces.

1ST COMPARISON EXAMPLE

The aqueous phase (W) and the monomer phase (M) were fed, via a measuring and regulation apparatus, at a constant ratio into the first reactor of a polymerization cascade, comprising 6 identical reactors each having a volume of 50 liters. The average residence time per vessel was 30 minutes. The activator phase A was fed into the 2nd reactor (1st polymerization vessel). The reaction occurred in the presence of air. The specified figures are parts by weight per time unit. The actual amounts are calculated from the recipe, the densities of the individual phases, the reactor volume which was flooded, and the average residence time.

| (M) = Monomer phase: | |
|---|---|
| Chloroprene | 100.0 |
| n-Dodecyl mercaptan | 0.13 |
| Phenothiazine | 0.015 |
| (W) = Aqueous phase: | |
| Demineralized water | 140.0 |
| Sodium Salt of a disproportionated abietic acid | 6.0 |
| Sodium salts of a condensation product from naphthalinesulphonic acid and formaldehyde | 0.7 |
| Caustic soda | 0.63 |
| (A) = Activator phase: | |
| 3% by weight aqueous formamidine-sulphinic acid solution | 0.060 |
| 3% by weight aqueous potassium peroxodisulphate solution | 0.070 |

The reaction started in the 1st polymerization vessel at an internal temperature of 14° C. The heat of polymerization being liberated was dissipated and the polymerization temperature was reduced to 10° C. by means of external cooling. The reaction mixture passes through the stirred vessel cascade corresponding to the feed into the first vessel. The reaction was terminated by addition of diethylhydroxylamine at a monomer conversion of 66%. The remaining monomer was removed from the polymer by steam distillation and the polymer latex, after reducing the pH to 6.5, was coagulated in a chilled mill and isolated. The Mooney viscosity ML-4 of the polymer was 98 ME (Experiment A).

2ND AND 3RD COMPARISON EXAMPLE

The polymerization was carried out as in the 1st Comparison Example, but the sulphonic acid was replaced by equimolar amounts of lauryl sulphate or a secondary alkylsulphonate. The results can be seen from the following table (Experiments B and C).

1ST AND 2ND EXAMPLE

The polymerization was carried out as in the 1st Comparison Example, but with equimolar amounts of n-dodecyl benzenesulphonate alone and with addition of a hydrocarbon (weight ratio 100:2) with a $C_A$ value of 34.5 and a $C_P$ value of 65.5 in place of the sulphonic acid. The results can be seen from the following table (Experiments D and E).

(A) Determination of the polymer colour

In order to assess the colour, the polymers are dissolved in toluene (20% by weight), and the colour of the solution is classified according to the RAL sample cards (Committee for Supply Conditions and Quality Assurance of the German Standards Committee (DNA), 6 Frankfurt/M. 1 Gutleutstr. 163–167).

The figures given in Table 1 correspond to the following RAL colour tones:

| No. | RAL No. | Colour |
|---|---|---|
| 3 | 9002 | grey-white |
| 2 | 1013 | pearl-white |
| 1 | 9001 | cream-white |
| 0 | 9010 | pure white |

The degree of whiteness increases from No. 3 to No. 0.

(B) Determination of the contact adhesion time of an adhesive solution

Preparation of the adhesive solution:

33 g of polymer were dissolved, with stirring, in 117 g of a solvent mixture comprising ethyl acetate/benzine having the boiling limits 65°/95° C., and toluene in the weight ratio 2:2:1 in a 250 ml wide-necked bottle with screw cap. To this purpose, the polymer was cut into pieces of 5 mm diameter. The dissolution occurred in the sealed bottle (screw cap with hole) within 16 hours at 300 rpm.

Measurement procedure:

Adhesive films, in a length of about 300 mm, which are 5 mm broad and 0.32 mm thick are applied to wood-free index carboard (250 g/m$^2$) in a standard climate (23° C./50% air humidity) using a template of wood-free art cardboard of 246 g/m$^2$ and a thickness of 0.32 mm and using a film applicator.

From these samples, adhesive films of length about 30 mm are cut out at intervals of 3 minutes and in each case two are placed crosswise on the stamp of an apparatus, so that an adhesive area of 0.25 cm$^2$ is produced. This is loaded for 10 sec with a constant 50 g.

The contact adhesive time ends when the adhesive films no longer adhere to one another after removal from the apparatus.

| Experiment | Contact adhesive time (min) |
|---|---|
| A | 60 |
| B | 15 |
| C | 18 |
| D | 51 |
| E | 63 |

TABLE

| Experiments | Biological degradation of the emulsifier (%) | Monomer conversion (%) | Polymer viscosity (ME) | Polymer colour | Behaviour in the drier | Remarks |
|---|---|---|---|---|---|---|
| A | 0 | 66 | 98 | 3 | perfect | — |
| B | >90 | 68 | 102 | 2 | flutters | strand formation unsatisfactory |
| C | 66 | 64 | 96 | 1 | flutters | coloration uneven (onion structure) |
| D | >90 | 68 | 95 | 0 | perfect (slight adhesion) | — |
| E | >90 | 67 | 97 | 0 | perfect | — |

We claim:

1. Process for the continuous polymerization of chloroprene in aqueous alkaline emulsion in the presence of emulsifiers and initiators at 0° to 60° C., wherein a mixture of 2.0 to 5.0% by weight of a salt of disproportionated abietic acid and 0.1 to 1.0% by weight, in each case relative to the total amount of monomer, of an n-dodecyl benzene sulphonate is used as emulsifier.

2. Process according to claim 1, characterized in that the polymerization is additionally carried out in the presence of 0.001 to 0.1% by weight, relative to the total monomers, of a hydrocarbon which contains aromatic ($C_A$), naphthenic ($C_N$) and paraffinic ($C_P$) carbon atoms in a concentration of $C_A$ 20–50%, $C_N$ 0–40% and $C_P$ 40–80%, and has a molecular weight of 180 to 750.

* * * * *